A. J. LIBERTY.
LUBRICATING SYSTEM FOR ENGINES.
APPLICATION FILED FEB. 6, 1909.

952,824.

Patented Mar. 22, 1910.

2 SHEETS—SHEET 1.

Witnesses:
J. H. Perrault
Grace E. Wynkoop

Antoine J. Liberty, Inventor
By S. E. Thomas
Attorney

A. J. LIBERTY.
LUBRICATING SYSTEM FOR ENGINES.
APPLICATION FILED FEB. 6, 1909.

952,824.

Patented Mar. 22, 1910.

2 SHEETS—SHEET 2.

UNITED STATES PATENT OFFICE.

ANTOINE J. LIBERTY, OF DETROIT, MICHIGAN.

LUBRICATING SYSTEM FOR ENGINES.

952,824.  Specification of Letters Patent.  Patented Mar. 22, 1910.

Application filed February 6, 1909. Serial No. 476,535.

*To all whom it may concern:*

Be it known that I, ANTOINE J. LIBERTY, a subject of Great Britain, residing at Detroit, county of Wayne, State of Michigan, have invented a certain new and useful Improvement in Lubricating Systems for Engines, and declare the following to be a full, clear, and exact description of the same, such as will enable others skilled in the art to which it pertains to make and use the same, reference being had to the accompanying drawings, which form a part of this specification.

My invention relates to means for lubricating the cylinder and crank-pin of a two-cycle engine, shown in the accompanying drawings and more particularly pointed out in the following specification and claims.

The object of this invention is to provide means whereby a fixed amount of lubricant may be fed regularly to the cylinder and crank-pin by means which will insure the delivery of oil to the parts under all working conditions.

Figure 1:
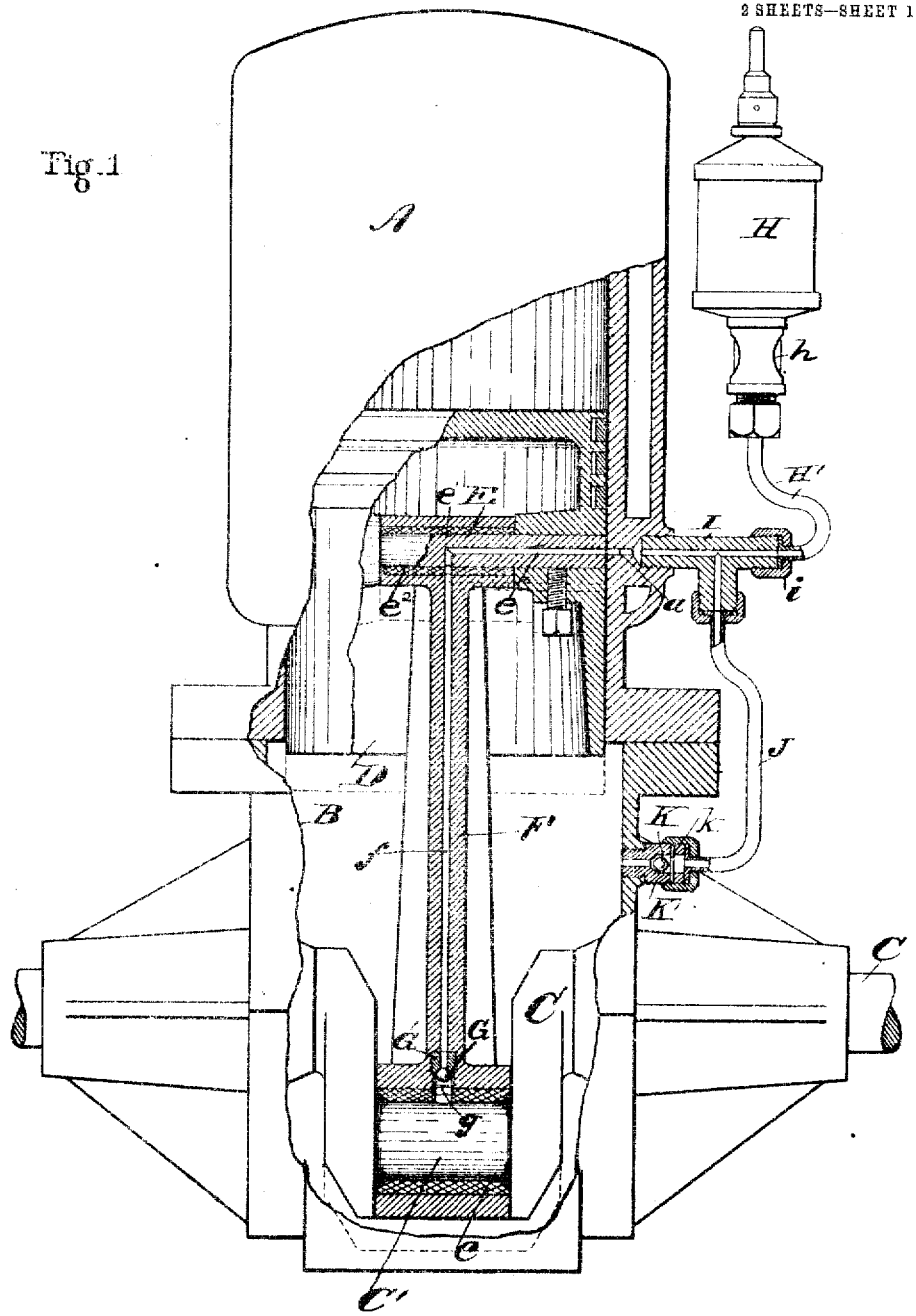
Figure 2:
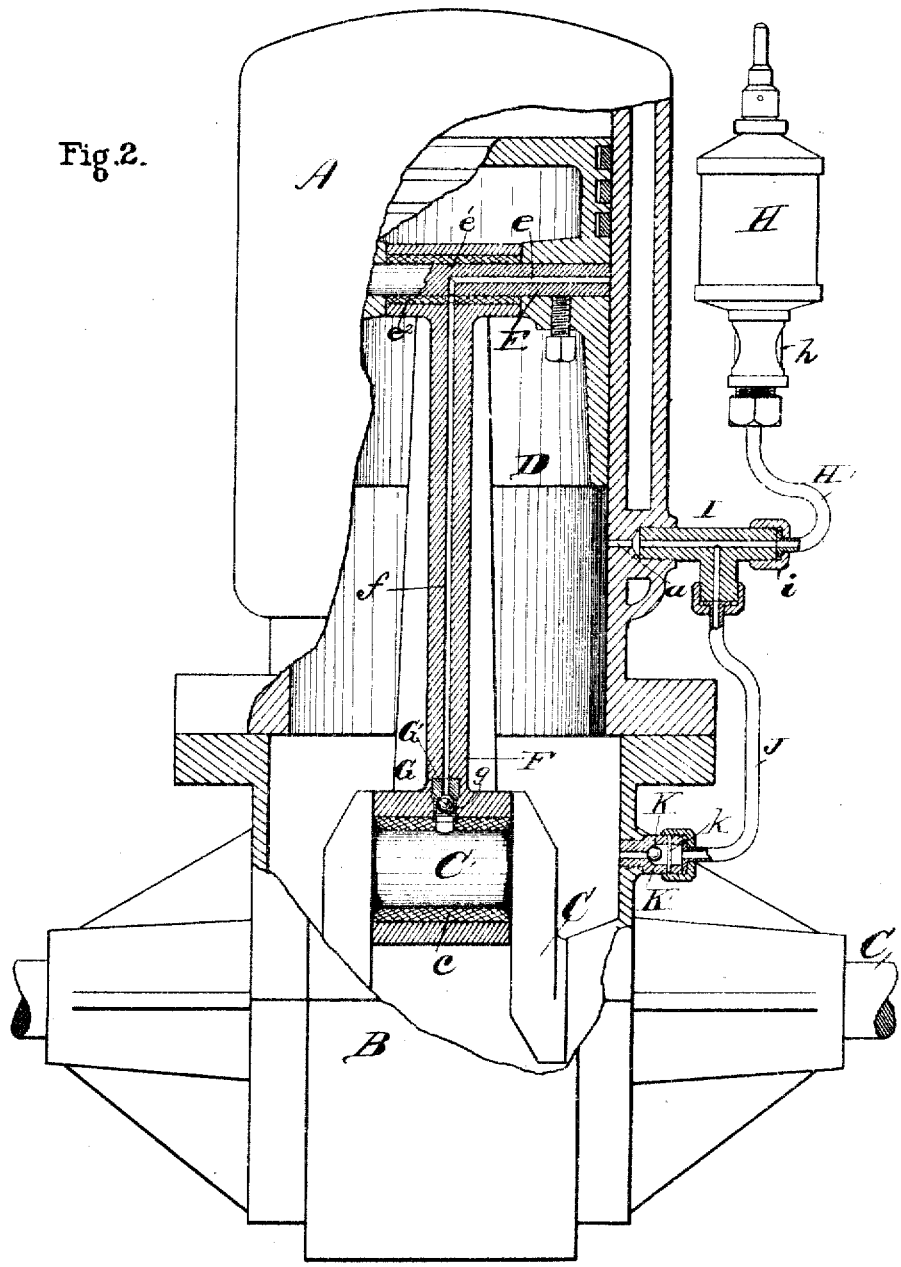

Referring to the drawings:—Figure 1 is a side elevation of a portion of a two-cycle engine with parts broken away and in section, disclosing the piston near the end of its down stroke,—the crank case being under compression. The dotted lines indicate the position of the piston at the lower limit of its stroke, the wrist-pin orifice having passed the orifice through the wall of the cylinder. Fig. 2 is a similar view showing the piston at the limit of its upward travel.

In carrying out my invention, a suitable oil-cup is provided with piping leading to a channel through the wall of the cylinder and also through the crank case. The wrist-pin is formed with a central bore which communicates with a longitudinal channel in the connecting rod through which oil is conveyed to the crank-pin.

In the channel formed in the connecting rod and adjacent to the crank-pin is located a suitable check valve and in the piping leading from the oil-cup to the crank case and near the latter is a similar check valve which alternately opens and closes as the piston reciprocates.

Referring now to the letters of reference placed upon the drawings: A represents the cylinder of a two-cycle engine; B its crank case; C the crank shaft.

D is the piston and E is the wrist-pin having a longitudinal bore $e$ for the passage of oil, also a peripheral groove $e'$ in communication therewith whereby the wrist-pin is lubricated.

F is a connecting rod also provided with a longitudinal bore $f$ communicating with the passage $e$ in the wrist-pin.

$e^2$ is a Babbitt-metal lining between the wrist-pin and the hub of the connecting rod F.

C' is a crank-pin and $e$ is a Babbitt-metal lining between the lower hub of the connecting rod F and the crank-pin.

G is a ball check valve lodged in a suitable valve cage G' and supported in the connecting rod F in line with the longitudinal bore $f$.

$g$ is a cross-pin to limit the downward movement of the ball.

H is an oil cup and $h$ its sight feed glass.

H' is a pipe leading from the oil cup to a T-fitting I, with which it is joined by a union $i$,—one arm of the fitting I being supported in the wall of the cylinder A.

$a$ is a passage or orifice in the wall of the cylinder through which oil passes to the interior of the cylinder or to the orifice in the crank-pin when the latter registers with the same, as shown in Fig. 1 of the drawings.

J is a pipe leading from the fitting I to the crank case B.

K is a check valve and K' its cage supported in the wall of the crank case and in line with the pipe J with which it is connected.

$k$ is a pin to limit the movement of the valve K.

Having indicated the several parts by reference letters, the operation of my improved lubricating system will be readily understood.

The cup H being filled with oil, on the downward movement of the piston, the check valve G will be forced to its seat due to the compression in the crank case while the check valve K will be forced from its seat, due to the same cause. The pressure created by the downward movement in the crank case up through the pipe J will force the oil fed through the oil cup, out through the fitting I, the channel $a$ and into the cylinder, lubricating the cylinder and piston. When the longitudinal bore $e$ in the wrist-pin registers with the passage $a$ in the cylinder, the oil will be forced through the longitudinal bore $e$ and into the longitudinal bore or passage *f* of the connecting rod F,—the valve G supporting the column of oil in the connecting rod until the piston has reached the lower limit of its stroke. On the return stroke of the piston the valve G will drop from its seat,—as it will then be relieved of the pressure which held it to its seat on the down stroke,—the oil in the connecting rod will thus be released to lubricate the crank-pin. At the moment the check valve G drops from its seat, the check valve K will seat,—due to the upward movement of the piston creating a partial vacuum and relieving the pressure in the crank case,—as will be readily understood. The closing of the check valve K serves to prevent the delivery of oil through the pipe J to the crank case and when said valve is open, the pressure created in the crank case by the downward movement of the piston serves to prevent the delivery of oil through said pipe to the crank case. It will thus be seen that while the pipe J communicates directly with the oil passage, no oil will be delivered through said pipe to the crank case and thereby wasted. The wrist-pin E is lubricated as the piston passes the channel *a*,—the oil entering between the periphery of the wrist-pin and surrounding wall of the piston. It is also fed out through the peripheral groove *e'* in the wrist-pin.

It will now be seen that as the piston moves downward the check valve G will be seated by the pressure in the crank case entering around the loosely fitting sleeve of the connecting rod on the crank-pin, and, bearing upon the underside of the valve, will hold it to its seat so that the oil which enters the connecting rod will remain therein until the piston starts on its upward stroke; whereupon the check valve G will drop from its seat releasing the oil in the connecting rod and thereby lubricating the crank-pin, as before explained.

Having thus described my invention, what I claim is:—

1. In a lubricating system for engines, a cylinder provided with an oil inlet, a crank case having a valve opening, a piston whose head is operable in the cylinder and whose piston rod is operable in the crank case, a wrist pin upon which the head is mounted, the wrist pin and piston rod being provided with communicating bores, the bore of the piston rod leading to the crank pin of said rod, a valve in the rod in line with the bore of the latter, an oil receptacle, a communicating passage between said receptacle and the oil inlet of the cylinder, and a communicating passage between the valved opening of the crank case and the passage between the receptacle and the oil inlet, whereby movement of the piston in one direction will cause the bore of the wrist pin to pass said oil inlet and receive oil which subsequently enters the bore of the piston rod, said valve of the piston rod being operable to close during said movement of the piston to confine the oil in the piston rod, the valve of said valved opening being opened during said movement of the piston to insure feeding of the oil to the wrist pin, the valve of the valved opening closing and the valve of the piston rod opening upon reverse movement of the piston to arrest the feed of the oil and permit discharge of the oil from the piston rod only during said reverse movement of the piston.

2. In a lubricating system for engines, a cylinder, a crank case, a piston whose head is operable in the cylinder and whose piston rod is operable in the crank case, a wrist pin upon which said head is mounted, the wrist pin being bored and the piston rod also having a bore communicating with the bore of the wrist pin, a crank pin upon which the piston rod is mounted, the bore of the piston rod leading to the wrist pin, an oil receptacle, a communication between the oil receptacle and the interior of the cylinder, a valved passage between the crank case and the passage between the oil receptacle and cylinder, and a valve in the piston rod in line with the bore of the latter, whereby movement of the piston in one direction will effect a feed of the oil from the receptacle to the wrist pin and subsequently to the bore of the piston rod wherein the oil is confined and discharged therefrom only upon the reverse stroke of the piston.

3. In a lubricating system for engines, a cylinder, a crank case, a wrist pin, a crank pin, a piston whose head is operable in the cylinder and whose piston rod is operable in said crank case and which has connection with said wrist and crank pins, the wrist pin being bored and the piston rod also having a bore communicating with the bore of the wrist pin and leading to the crank pin, a valve in the piston rod in line with the bore of the latter, an oil receptacle, a communication between the oil receptacle and the interior of the cylinder, a valved passage between the crank case and the passage between the oil receptacle and cylinder, and a valve in the piston rod in line with the bore of the latter whereby movement of the piston in one direction will effect a feed of the oil from the receptacle to the wrist pin and subsequently to the bore of the piston rod wherein the oil is confined and discharged therefrom only upon opening of the piston rod valve incident to the reverse stroke of the piston.

4. In a lubricating system for engines, a cylinder, a crank case, the cylinder and the crank case each having an opening, an oil receptacle having communication with the opening of the cylinder, a bored connection between the opening of the crank case and the connection existing between said receptacle and the opening of the cylinder, a piston in the cylinder including a head, a bored wrist pin upon which the head of the piston is mounted and also including a bored piston rod and the crank pin upon which the piston rod is mounted, the bore of the piston rod communicating with the bore of the wrist pin and leading to the crank pin, a valve in the piston rod in line with the bore of the latter, whereby on movement of the piston in one direction the oil of said receptacle will enter the wrist pin and pass into the bore of the piston rod, the valve of the piston rod being closed by pressure in the crank case during the movement of the piston in said one direction and opening only when the pressure is relieved incident to the movement of the piston in the opposite direction and thereby permit of the oil in the bore of the piston rod to be supplied to the crank pin of the piston rod only when said piston moves in said opposite direction.

5. In a lubricating system for engines, a cylinder provided with an oil inlet, a crank case having a valved opening, a wrist pin, a crank pin, a piston operable in the cylinder and having operative connection with the wrist and crank pins, the wrist pin and piston rod being provided with communicating bores, the bore of the piston rod leading to the crank pin of said rod, a valve in the piston rod in line with the bore of the latter, a T-shaped fitting secured to the cylinder and bored for communication with the oil inlet, an oil receptacle, a passage between the oil receptacle and the T-shaped fitting, and a passage between the T-shaped fitting and said valved opening of the crank case, said fitting being further bored to establish communication between the first mentioned bore and said passage between the fitting and valved opening, whereby movement of the piston in one direction will cause the bore of the wrist pin to pass the said oil inlet and receive oil which passes into the bore of the piston rod, said valve of the piston rod being closed during said movement of the piston to confine the oil in the piston rod, and the valve of said valved opening being opened to insure the feed of the oil through the wrist pin during such movement of the piston, the valve in the valved opening closing and the valve in the piston rod opening upon reverse movement of the piston to arrest the feed of oil into the wrist pin and permit the discharge of the oil from the piston rod to the crank pin only during said reverse movement of the piston.

6. In a lubricating system for engines, a cylinder, a crank case, a crank pin, a wrist pin, a piston operatively connected to said wrist and crank pins operable in the cylinder and having its piston rod projecting into the crank case, the wrist pin being bored and the crank rod also being bored with its bore communicating with the bore of the wrist pin, means whereby oil may be supplied to the bore of the wrist pin during one movement of the piston and permit it to pass into the bore of the piston rod and confined therein during movement of the piston in said one direction, means whereby compression superinduced by said movement of the piston may effect a positive feeding of the oil to the wrist pin, and means whereby the oil in the bore of the piston rod may be supplied to the crank pin upon which the piston rod is mounted only upon reverse movement of the piston.

7. In a lubricating system for engines, a cylinder, a crank case, a wrist pin, a crank pin, a piston operatively connected to the wrist and crank pins and operable in the cylinder and having its piston rod projecting into the crank case, the wrist pin having a bore and the piston rod having a bore communicating with the bore of the wrist pin with the bore of the piston rod leading to the crank pin upon which the piston rod is mounted, means whereby upon movement of the piston in one direction oil may be supplied to the wrist pin and consequently also to the bore of the piston rod, means whereby on a reverse movement of the piston the feed of oil to the wrist pin is stopped and means whereby the oil of the piston rod may be supplied without waste to the crank pin of the piston rod only at the time said vacuum is created.

8. In a lubricating system for engines, a bored wrist pin, means for introducing oil thereto, a crank pin, a piston mounted upon the wrist pin and the crank pin and having a bored piston rod whose bore communicates with the bore of the wrist pin and directly with the crank pin, and a check valve located in the bore of the piston rod adapted to close the passage through the piston rod when the piston is moved in one direction.

9. In a lubricating system for internal combustion engines, a crank pin, a bored wrist pin, means for introducing oil thereto, a piston having a bored piston rod adapted to receive oil from the bore of the wrist pin and deliver the oil to said crank pin upon which the piston rod is mounted, a check valve located in the bore of the piston rod to close said passage intermittently, a communicating passage leading from the crank case of the engine to the feeding means, and a check valve located in the communication between the crank case and feeding means adapted to intermittently close said passage, opening and closing alternately with the opening and closing of the aforesaid check valve.

10. In a lubricating system of internal combustion engines, an engine cylinder, a crank case, a wrist pin, a crank pin, means for feeding oil through the wall of the cylinder, a piston connected to the wrist and crank pins and operable in the cylinder and having its wrist pin bored to receive oil from the feeding means, the piston rod of the piston being bored with its bore communicating with the bore of the wrist pin and adapted to receive oil for deliverance to the crank pin upon which the piston rod is mounted, a check valve located in the bore of the piston rod to intermittently close the bore of the piston rod, a communicating passage leading from the crank case to the feeding means, and a check valve located in said passage adapted to intermittently close the same, one valve opening and closing alternately with the opening and closing of the other valve.

In testimony whereof, I sign this specification in the presence of two witnesses.

ANTOINE J. LIBERTY.

Witnesses:
GRACE E. WYNKOOP,
SAMUEL E. THOMAS.